UNITED STATES PATENT OFFICE 2,313,372

ELECTRODEPOSITION OF LEAD

James R. Stack, Pittsburgh, Pa.; Alvilda L. Stack, Montpelier, Vt., executrix of said James R. Stack, deceased, assignor, by mesne assignments, to Carnegie-Illinois Steel Corporation, Pittsburgh, Pa., a corporation of New Jersey No Drawing. Application June 28, 1940,
Serial No. 342,956

11 Claims. (Cl. 204—53)

This invention relates to the electrodeposition of lead and more particularly to a process for the electroplating, electrorefining, electrowinning and electroforming of lead from anodes containing the same.

An object of the invention is to provide a novel and improved electrolyte for the above purpose.

Another object is to provide an electrolyte for the above purpose which is a good conductor of electricity, which is not easily decomposable by heat, in which lead is readily soluble and which is capable of operating efficiently to produce a smooth, dense, fine, adherent deposit.

Another object is to provide a novel and improved electrolyte and process which is suitable for the production of thick cathode deposits.

Another object is to provide a novel and improved electrolyte and process for the above purpose wherein the loss of metal values in the slime, and the cathode contamination, are reduced to a minimum.

Another object is to provide an efficient, dependable and economical process for the above purpose.

Various other objects and advantages will be apparent as the nature of the invention is more fully disclosed.

Although the novel features which are believed to be characteristic of this invention are more particularly pointed out in the claims appended hereto, the invention itself may be better understood by referring to the following description, in which a specific embodiment thereof has been set forth for purposes of illustration.

In the following description and in the claims certain specific terms have been used for convenience in referring to various details of the invention. It is to be understood, however, that these terms are to be given as broad an interpretation as the state of the art will permit.

Certain prior processes for the electrodeposition of lead such, for example, as the so-called Betts process and various modifications and improvements thereof utilizing fluosilicic acid and fluoboric acid have various disadvantages from a commercial standpoint which render them uneconomical and unsatisfactory. Such electrolytes, for example, are not good conductors of electricity, have a high vapor pressure, are volatile, are easily decomposed thermally and electrolytically, are uneconomical as to acid and current consumption, and do not produce a cathode deposit which is sufficiently smooth and dense to be built up to any great thickness.

In accordance with the present invention, these various difficulties are overcome and the cost of depositing lead electrolytically is materially reduced by providing an improved electrolyte having high conductivity, which is non-volatile, is capable of forming highly soluble salts of lead, and produces a smooth, dense, adherent cathode deposit of fine crystalline structure which is free from growths and trees. The electrolyte is suitable for both electrorefining and electroplating without the use of addition agents, although, in certain instances, addition agents in moderate quantities may be used if desired.

More specifically, I have found that an electrolyte comprising benzene disulphonic acid and an aromatic compound of the type referred to below is ideally suited for the electrodeposition of lead.

Benzene disulphonic acid provides the solvent for the lead and is particularly suited for the present purpose for the following reasons:

1. The vapor pressure of the acid is so extremely low that it is unaffected by distillation methods, thus acid losses from the electrolyte due to volatilization do not occur.

2. Benzene disulphonic acid and its compounds are very stable. Heating of the electrolyte does not therefore result in decomposition and precipitation of "slimes."

3. The lead salt of benzene disulphonic acid is characterized by high solubility permitting the preparation and maintenance of much more concentrated electrolytes than have heretofore been available.

I have found, however, that the successful use of the benzene disulphonic acid electrolyte for the electrodeposition of lead depends on the presence in the electrolyte of a sulphonyl compound (sulphone). When this agent is not present the deposit obtained is loosely crystalline and non-adherent.

More specifically, I have found that certain sulphones of the type

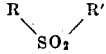

where R and R' represent aromatic radicals of the benzene or naphthalene series, each having as substituents one or more hydroxy groups, are suited for the above purpose. I prefer a sulphone of phenol having the formula $(C_6H_5OH)_2SO_2$.

Other soluble aromatic sulphones may also be used, such as the sulphones of cresol, resorcinol, and naphthol, or, in general, those forming soluble salts of lead.

I have found the presence of the sulphone to be beneficial in any of the electrolytes commonly used in the electrodeposition of lead. For example the deposits obtained from the fluoborate and fluosilicate baths are markably improved by the addition of this agent, as are the deposits obtained from the phenol and cresol sulphonic acid baths. However, the use of benzene disulphonic acid is preferred to any of the above mentioned electrolytes for the reasons previously outlined.

An electrolyte of satisfactory composition may have the following ingredients in about the following proportions:

| | Grams per liter |
|---|---|
| Benzene meta disulphonic acid | 200 to 400 |
| Sulphone of phenol | 5 to 25 |
| Lead | 20 to 80 |

The electrolyte may be operated at a temperature range of from 40° C. to 80° C. and the current density for electrodeposition with soluble anodes and without rapid circulation may vary from 10 to 100 amperes per sq. ft. For plating with rapid circulation or agitation, the current density may vary from 100 to 600 amperes per sq. ft.

The conductivity of the above mentioned electrolyte is such that the cell voltage for refining purposes and at a normal current density of 15 amperes per sq. ft. and an electrode spacing of about 1¼ inches may vary from .1 to .3 volt depending on the age and purity of the anode.

Certain addition agents, such as glue and goulac may be used, if desired, but are not strictly necessary and, if used, only a comparatively small quantity thereof is required.

The operation of the cell is similar to the well-known Betts process. As the anodes are consumed they may be replaced by fresh anodes and when the cathodes have grown to the desired thickness they may be removed for remelting and replaced by new starting sheets.

The improved electrolyte of the present invention may be advantageously used for electroplating with lead. Coatings from .0001 to .001 inch thick may be made economically in commercial operation.

The above described electrolyte is suited for various processes wherein lead is to be deposited, such as for refining, winning, forming, plating etc. and is applicable for the deposition of certain lead alloys, provided the various alloy metals are such as to be soluble in the electrolyte.

While certain specific embodiments of the invention have been set forth for purposes of illustration, it is to be understood that the invention may be applied to various uses and that changes and modifications may be made therein as will be apparent to a person skilled in the art. The invention is only to be limited in acordance with the following claims.

What is claimed is:

1. An electrolyte for the deposition of lead comprising lead in solution in benzene disulphonic acid and a sulphone of a substance selected from the group consisting of phenol, cresol, resorcinol and naphthol.

2. An electrolyte for the deposition of lead comprising lead in solution in benzene disulphonic acid and a sulphone of phenol.

3. An electrolyte for the deposition of lead comprising lead in solution in benzene disulphonic acid and a sulphone of cresol.

4. An electrolyte for the deposition of lead comprising the following ingredients in about the following proportions:

| | Grams per liter |
|---|---|
| Benzene disulphonic acid | 200 to 400 |
| Sulphone of phenol | 5 to 25 |
| Lead | 20 to 80 |

5. The method of refining lead which comprises making the lead into an anode and electrolyzing the same in an electrolyte comprising lead in solution in benzene disulphonic acid and a sulphone of a substance selected from the group consisting of phenol, cresol, resorcinol and naphthol.

6. The method of refining lead which comprises making the lead into an anode and electrolyzing the same in an electrolyte comprising lead in solution in benzene disulphonic acid and a sulphone of phenol.

7. The method of refining lead which comprises making the lead into an anode and electrolyzing the same in an electrolyte comprising lead in solution in benzene disulphonic acid and a sulphone of creosol.

8. The method of refining lead which comprises making the lead into an anode and electrolyzing the same in an electrolyte comprising the following ingredients in about the following proportion:

| | Grams per liter |
|---|---|
| Benzene disulphonic acid | 200 to 400 |
| Sulphone of phenol | 5 to 25 |
| Lead | 20 to 80 |

9. The method of electrodepositing lead from a benzene disulphonic acid electrolyte containing the lead in solution which comprises electrolyzing the same in the presence of a sulphone represented by the formula

where R and R' each represents an aromatic radical selected from the group consisting of the benzene and the naphthalene radicals, each aromatic radical having as substituent at least one hydroxy group.

10. An electrolyte for the deposition of lead comprising lead in solution in benzene disulphonic acid and a sulphone represented by the formula

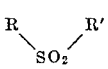

where R and R' each represents an aromatic radical selected from the group consisting of the benzene and the naphthalene radicals, each aromatic radical having as substituent at least one hydroxy group.

11. The method of refining lead which comprises making the lead into an anode and electrolyzing the same in an electrolyte comprising lead in solution in benzene disulphonic acid and a sulphone represented by the formula

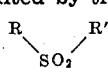

where R and R' each represents an aromatic radical selected from the group consisting of the benzene and the naphthalene radicals, each aromatic radical having as substituent at least one hydroxy group.

JAMES R. STACK.